Jan. 10, 1967 L. JACOBIN ET AL 3,296,875

DEVICE FOR SETTING THE ANGULAR POSITION OF
A FIRST OBJECT WITH RESPECT TO A SECOND

Filed April 28, 1964

Inventors
LEO JACOBIN
WILLY C. M. GIELE.
By Percy P. Lantzy
Attorney

United States Patent Office 3,296,875
Patented Jan. 10, 1967

3,296,875

DEVICE FOR SETTING THE ANGULAR POSITION OF A FIRST OBJECT WITH RESPECT TO A SECOND

Leo Jacobin, Antwerp, and Willy Camiel Maria Gielen, Hoboken-Antwerp, Belgium, assignors to International Standard Electric Corporation, New York, N.Y., a corporation of Delaware Filed Apr. 28, 1964, Ser. No. 363,168
Claims priority, application Belgium, May 14, 1963, 632,294
6 Claims. (Cl. 74—89.15)

The invention relates to a device for setting the angular position of a first object with respect to a second, and more particularly to a device for setting the azimuth of a magnetic recording and reading head with respect to a magnetizable support, such as for instance a magnetic tape.

In the magnetic recording technique it is known to be important that the azimuth of the head with respect to the tape absolutely remains the same as the reading and at the recording operations.

This requirement is particularly strict in recorders of the type using wide tapes having a large number of tracks (for instance about a dozen), and wherein the signals recorded on the outside tracks have to be read in perfect synchronism. Due to the air gap of the magnetic heads being narrow, it is clear that if the azimuth is not adjusted with a very high precision, the reading of these signals cannot be performed in perfect synchronism.

When a magnetic head is used for recording and afterwards for reading the recorded signals, without the head being manipulated between these two operations, said synchronism and the exact reading of what has been recorded are obviously both obtained. But if for any reason the head has been manipulated or replaced between the recording and reading operations, or if signals have to be read which have previously been recorded on another apparatus, it will be necessary to readjust the azimuth of the head.

An object of the the invention is thus to realize a device carrying the magnetic head and permitting a very exact setting of this azimuth.

Another object of the invention is to realize such a device in which first a preliminary coarse setting and afterwards a fine setting may be performed.

Still another object of the invention is to be able to carry out said fine setting during the operation of the apparatus, so as to be able to observe at its output the result of the accomplished setting and this during the reading operation.

According to a feature of the invention, said first object is carried by a first part hinged according to a distinct axis about at least one pivot point a first point of said first part being urged by a force applying member, while a second point on a wall of said first part is withheld by a stop member which may be displaced according to a direction forming a small angle with said wall of said first part, the angle between said wall and said axis being considerably different from 90°, so that said first part pivots, about its axis when said stop member is displaced.

According to another feature of the invention said stop member bears against a face of a prism or of a truncated pyramid supported by two pivots which are eccentric with respect to its axis so as to realize a coarse setting of said angular position of said object by the choice of the face of said prism or of said pyramid which will be brought into contact with said stop member.

The above mentioned and other objects and features of the invention will become more apparent and the invention itself will be best understood by referring to the following description of an embodiment taken in conjunction with the drawings in which.

Figure 1:
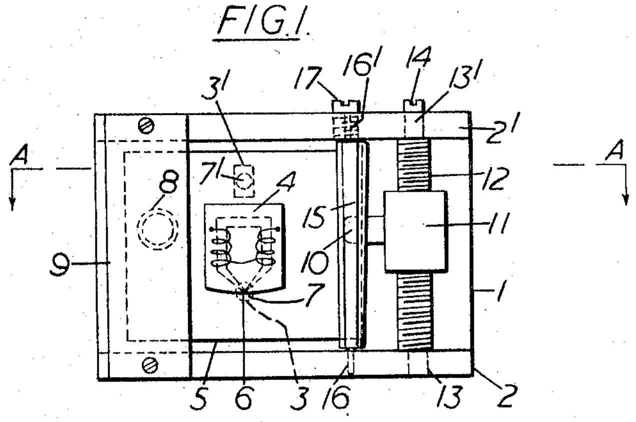
FIGURE 1 is a front view of the device described hereafter.
Figure 2:
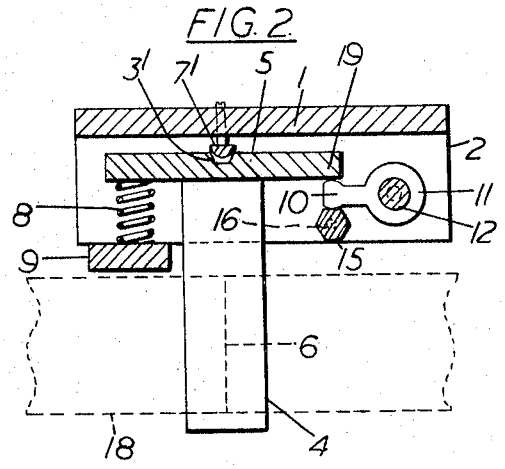
FIGURE 2 is a cross-sectional plan view according to a line A–A′ of FIGURE 1.

A preferred embodiment of the device according to the invention includes a base plate 1 having two flanges 2 and 2′. The multiple cell magnetic head 4 is fixed on a plate 5.

The rear face of plate 5 has a first cavity 3 in the shape of a spherical cap or of a truncated cone and a second cavity 3′ in the shape of a portion of a cylinder or of a prism having a trapezoidal cross-section which is substantially equal to the longitudinal cross-section of the first cavity.

The semi-spherical head of two screws 7 and 7′ are located in these cavities and form pivots for the plate 5. These screws 7 and 7′ are screwed in the base plate 1 and their heads which protrude behind this plate are provided with a groove permitting to screw them by means of a small screwdriver.

The plate 5 is urged against the screws 7 and 7′ by the joint action of the spring 8 compressed by the part 9 and of the stop member 10 carried by the small threaded tube 11. This small tube 11 is engaged on a screw 12, the pivots 13 and 13′ of which are engaged in the bearings carried by the flanges 2 and 2′. The end of the pivot 13′ has a groove 14 so as to be able to be screwed by means of a screwdriver.

The stop member 10 is hence able to rotate about the screw 12, together with the small tube 11 but it bears against a part 15 which has the shape of a truncated pyramid, the top angle of which is very small and which is maintained between the two flanges 2 and 2′ by its pivots 16 and 16′ which are eccentric with respect to the axis of the pyramid. The pivot 16′ rotates in a bearing 17 which may easily be removed by unscrewing it to modify, if necessary, the angular position of the part 15.

The part 15 may also have the shape of a prism. In this case, its axis must be inclined with respect to the plate 5, or else a slightly inclined plane must be cut at the edge 19 of the plate 5 where the stop 10 makes contact.

The settings are performed in the following way:

A. To set the transversal position of head 4 with respect to the magnetic tape 18, the screw 7 is rotated and then the position is corrected in accordance with the settings hereinafter described.

B. To set the parallelism of the head 4 with the plane of tape 18 the screw 7′ is rotated, due to which the plate 5 is moved about screw 7, the center of the head of which is situated on the prolongation of the line 6 of the air gaps of the cells of the head 4. Due to this, the transversal position of the head is practically not varied. Afterwards, the azimuth is corrected in the manner described hereinafter.

C. To set the azimuth of the head 4 with respect to the tape 18, a coarse setting is first of all carried out by pivoting the pyramid 15 in order to choose the face which will give the best approximation. Due to the eccentricity of pivots 16 and 16′, the various faces of the pyramid 15 determine different positions of the stop member 10, when they are brought in contact with the latter. Afterwards, a very fine setting may be realized by screwing the screw 12 so as to displace the small tube 11 from top to bottom. Due to this the stop member 10 slides along the face of the pyramid, thus causing a micrometric displacement of the end 19 of plate 5 and hence a modification of the azimuth of the head 4 with respect to the tape 18.

It is to be noted that the setting of the parallelism modifies the relative inclination between the two contact surfaces of the stop member 10 (pyramid 15 and plate 5). However, the maximum amplitude of the movements of the movable equipment, due to the above mentioned settings, is slight, so that practically, in the way the present device is realized, one does not run the risk of making at a certain moment, these two surfaces parallel, such a parallelism cancelling the effect of the micrometric setting.

While the principles of the invention have been described above in connection with specific apparatus, it is to be clearly understood that this description is made only by way of example and not as a limitation on the scope of the invention.

We claim:

1. A device for setting the angular position of a first object with respect to a second object comprising means supporting said first object adjacent said second object, means hinging said support means whereby said support means is rotatable about the axis of said hinging means and rotatable in a transverse direction, a force applying member urging said support means about said hinge axis, a stop member disposed adjacent said support means to control the rotation of said support means and means to displace said stop member in a direction parallel to said hinge axis so that said support means pivots about said hinge axis.

2. A device according to claim 1 wherein said support means is a flat member and said hinge axis is substantially at the center thereof, said force applying member is a spring and further comprising a member with non-parallel sides disposed adjacent said stop member on the side opposite said flat member.

3. A device as claimed in claim 2, wherein said hinging means which determines said axis is constituted by two screws with substantially semispherical heads located at cavities at the rear face of said flat member carrying said first object, the cavity cooperating with a first of said two screws having the shape of a spherical cap and having its center in an axis substantially perpendicular to said flat member while the cavity cooperating with the second screw has a shape of a trapezoidal prism directed towards said first screw, so that the operation of said screws permits a longitudinal setting of the position of said first object as well as a movement in a plane which is substantially perpendicular to the plane of movement of said angular position setting.

4. A device as claimed in claim 3, wherein said member with non-parallel sides includes a truncated pyramid and further comprising two pivots supporting said truncated pyramid at each end thereof, said pivots being eccentric with respect to the axis of said pyramid whereby a coarse setting of the angular position of said flat member may be realized by movement of said stop member.

5. A device according to claim 4 further comprising a threaded rod, the axis thereof being substantially parallel to said hinge axis, a threaded bushing carried by said threaded rod and movable thereon, and means disposing said stop member on said threaded bushing

6. A device according to claim 5 wherein said first object is a magnetic recording and reading head and said second object is a magnetic tape.

References Cited by the Examiner

UNITED STATES PATENTS 2,680,397 6/1954 Saunders-Singer ---- 74—110 X

FRED C. MATTERN, Jr., *Primary Examiner.*

F. E. BAKER, *Assistant Examiner.*